United States Patent
Lin et al.

(10) Patent No.: US 10,567,503 B2
(45) Date of Patent: Feb. 18, 2020

(54) METHOD AND APPARATUS FOR UPDATING DATA

(71) Applicant: Guangdong Oppo Mobile Telecommunications Corp., Ltd., Dongguan, Guangdong (CN)

(72) Inventors: Lian Lin, Guangdong (CN); Shiying Xie, Guangdong (CN); Jin Liu, Guangdong (CN); Juhong Lu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 224 days.

(21) Appl. No.: 15/788,314

(22) Filed: Oct. 19, 2017

(65) Prior Publication Data

US 2018/0288149 A1    Oct. 4, 2018

(30) Foreign Application Priority Data

Mar. 28, 2017  (CN) .......................... 2017 1 0191606

(51) Int. Cl.
*H04L 29/08* (2006.01)
*H04W 8/22* (2009.01)

(52) U.S. Cl.
CPC .......... *H04L 67/1095* (2013.01); *H04L 67/16* (2013.01); *H04W 8/22* (2013.01); *H04L 67/26* (2013.01)

(58) Field of Classification Search
CPC ..... H04L 67/1095; H04L 67/16; H04L 67/26; H04W 8/22
See application file for complete search history.

(56) References Cited

U.S. PATENT DOCUMENTS

2006/0230395 A1*  10/2006  Paul .......................... G06F 8/65
                                                                          717/173
2011/0016087 A1    1/2011  Freedman
(Continued)

FOREIGN PATENT DOCUMENTS

CN    103402194 A    11/2013
CN    103428188 A    12/2013
(Continued)

OTHER PUBLICATIONS

Open Mobile Alliance, DS Protocol—Approved Version 1.2.1, Aug. 10, 2007, OMA-TS-DS_Protocol-V1_2_1-20070810-A (Year: 2007).*
(Continued)

*Primary Examiner* — Wing F Chan
*Assistant Examiner* — Billy H Ng
(74) *Attorney, Agent, or Firm* — Young Basile Hanlon & MacFarlane, P.C.

(57) ABSTRACT

A method and an apparatus for updating data are provided. The method for updating data includes the follows. A terminal receives an update reminder message pushed by a cloud server. The terminal detects whether there is anchor point information corresponding to the update reminder message at the terminal; when the anchor point information corresponding to the update reminder message is detected at the terminal, the terminal sends the anchor point information to the cloud server so that the cloud server generates an update data packet based on the anchor point information. The terminal performs a first update process on data of the terminal.

14 Claims, 7 Drawing Sheets

(56) References Cited

U.S. PATENT DOCUMENTS

| | | | |
|---|---|---|---|
| 2012/0179653 A1 | 7/2012 | Araki et al. | |
| 2012/0297012 A1* | 11/2012 | Sharp | G06Q 10/00 709/213 |
| 2013/0060900 A1* | 3/2013 | Li | H04L 67/1095 709/217 |
| 2014/0304700 A1 | 10/2014 | Kim et al. | |
| 2014/0380295 A1* | 12/2014 | Chen | G06F 8/65 717/170 |
| 2016/0134695 A1 | 5/2016 | Liang et al. | |

FOREIGN PATENT DOCUMENTS

| | | | |
|---|---|---|---|
| CN | 104216727 A | 12/2014 | |
| CN | 104615453 A | 5/2015 | |
| CN | 104750524 A | 7/2015 | |

OTHER PUBLICATIONS

"Open mobile alliance DS protocol", Open Mobile Alliance DS PROT, OMA, Aug. 10, 2007, pp. 1-95, GB (author unknown).

Extended European search report issued in corresponding European application No. 17196534.6 dated Dec. 6, 2017.

International Search Report issued in corresponding International Application No. PCT/CN2017/105559 dated Dec. 28, 2017 (11 pp).

Colt Mcanlis: "Gamasutra—In-depth: A simple system to patch your game content", Nov. 14, 2012.

Office Action 1 issued in corresponding EP application No. 17196534.6 dated Sep. 7, 2018.

European Examination Report issued in corresponding European Application No. 17196534.6 dated Aug. 27, 2019.

\* cited by examiner

METHOD AND APPARATUS FOR UPDATING DATA

CROSS-REFERENCE TO RELATED APPLICATION(S)

This application claims priority to Chinese patent application No. 201710191606.1, filed on Mar. 28, 2017, the disclosure of which is herein incorporated by reference in its entirety.

TECHNICAL FIELD

This disclosure relates generally to the field of communication technology, and more particularly relates to a method and an apparatus for updating data.

BACKGROUND

Cloud services, also known as network services, refer to link computing work of multiple computers through a network or to access services provided by a remote host via a network connection. With smart terminals being increasingly popular, users can log in to a cloud server using their personal cloud accounts and passwords, and then synchronize and back up data of the terminal to the network cloud, or download required data from the network cloud.

But when synchronizing and backing up the data of the terminal to or downloading data from the network cloud, the user may need to perform repetitive operations due to the switching on/off of the cloud service function, affecting the efficiency of the data synchronization operation. In the case of terminal data, the user will delete data on the terminal when the cloud service function is disabled; when the cloud service function is restarted, the terminal will automatically download the data stored in the cloud, which will affect the effectiveness of data synchronization.

BRIEF DESCRIPTION OF THE DRAWINGS

Technical solutions and other advantageous effects of the disclosure will be apparent from the following detailed description of implementations with reference to the accompanying drawings, in which.

DETAILED DESCRIPTION

Figure 1:
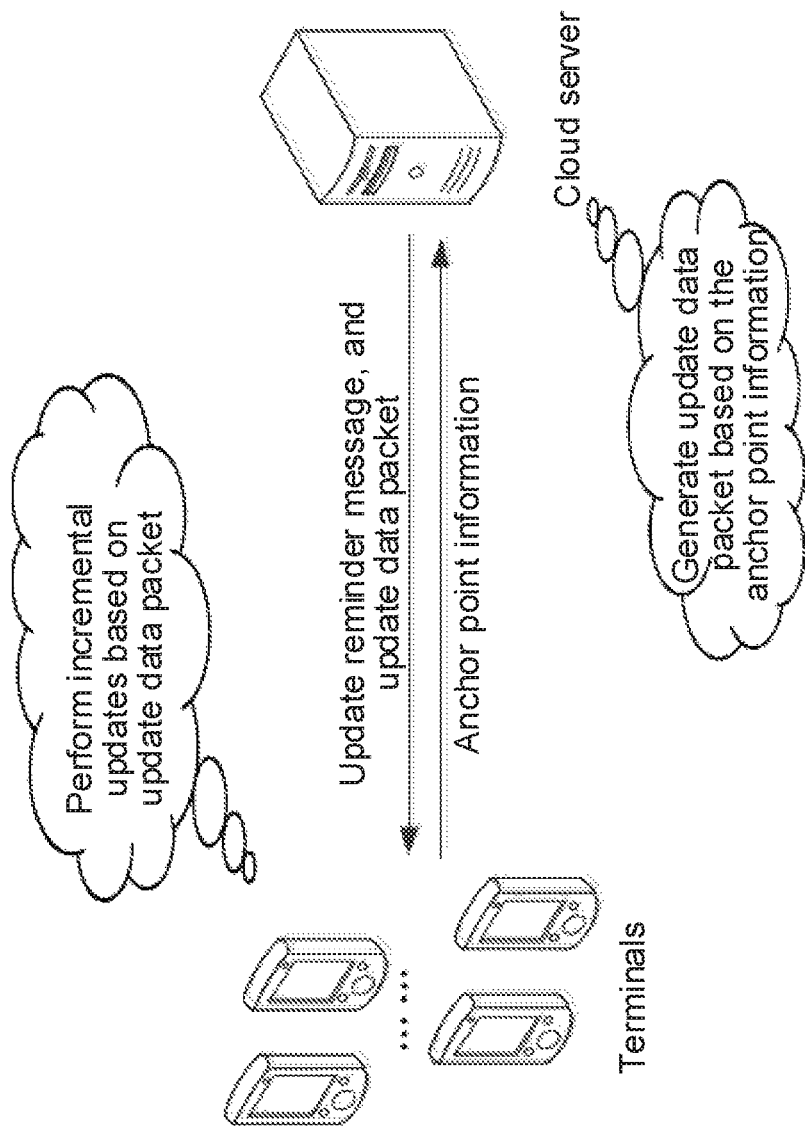
FIG. 1 is an illustrative scenario diagram of a system for updating data in accordance with an implementation of the disclosure.

Reference is made to the drawings in which like reference signs refer to like elements or parts. The principle of the disclosure is illustrated by implementation in a suitable computing environment by way of example. The following description is based on the illustrated implementations of the disclosure, which however should not be construed as limiting other implementations of the disclosure which are not detailed herein.

In the following description, various implementations of the disclosure will be described with reference to steps and operations performed by one or more computers, unless otherwise stated. Thus, these steps and operations will be referred to several times as being executed by a computer, where "execution by computer" as discussed herein encompasses operations of a computer processing unit, which embodying electronic signals of data in structured form. Operations of the computer processing unit can transform data or maintain it at a location in the memory of the computer; the computer processing unit can re-configure the operation of the computer or otherwise change the operation of the computer in a manner well-known to those of ordinary skill in the art. Data structure maintained by the data is a physical location in the memory, and has particular properties defined by the data format. Nevertheless, the foregoing illustrating the principle of the disclosure is not to be construed in a constrictive sense, and those of ordinary skill in the art will appreciate that various steps and operations described below can also be implemented by hardware.

Principles of the disclosure may operate using many other general-purpose or special-purpose computations, communication environments, or configurations. Examples of well-known computing systems, environments, and configurations suitable for use with this disclosure may include without limitation, mobile phones, smart phones, personal digital assistants (PDAs), personal computers, servers, multiprocessor systems, micro-computer dominated systems, mainframe computers, and distributed computing environments including any of the foregoing systems or devices.

Terms that are relevant herein are explained as follows.

Incremental Update

"Incremental update" refers to update data of a certain type that has been changed rather than all data of the certain type at the terminal.

Full Update

"Full update" refers to update all data of a certain type at the terminal. The type of data may include but not limited to photo album, text messages, call records, contacts, document, audio/video, calendar, email, system settings and the like.

Update

"Update" includes but not limited to addition, modification, deletion and the like to achieve data synchronization between a cloud server and a terminal.

Anchor Point Information

"Anchor point information" is used to indicate a version number as well as information associated with the version number at the time of backup. In implementations of the disclosure, the anchor point information can be understood as an anchor point model. The anchor point model may include account identification (ID) information, terminal identification information, an anchor point, and anchor point details. The anchor point is the version number generated at the time of backup by the user, and a link to this anchor point is created and can be used to acquire data associated with the version number. The anchor point may also function as a timestamp. The anchor point details refer to data information contained in a version, such as source data identification information, time information, backup operation record information, etc.

Methods, apparatuses and systems for updating data are provided. Among them, one apparatus for updating data can be applied to a terminal, while the other apparatus for updating data can be applied to a cloud server.

For example, FIG. 1 is a scenario diagram of a system for updating data provided herein. The system for updating data is typically applied to an application environment involving a terminal and a cloud server, where the cloud server and the terminal can communicate in a wired or wireless manner. The wireless manner includes but not limited to WiFi, Bluetooth, ZigBee, Irda, near field communication (NFC), HomeRF, ultra-wideband (UWB), Z-Wave, and the like. The wired manner includes but not limited to asymmetric digital subscriber line (ADSL), local area network (LAN), modem, Ethernet passive optical network (EPON), Gigabit-capable PON (GPON), and the like. The terminal mentioned herein may refer to one or more terminals, including without limitation: storage terminals such as flash disks, portable hard drives, SD cards, or smart cards, or terminals such as mobile phones.

In this application, the terminal is typically configured to receive an update reminder message from the cloud server, e.g., an update reminder message that reminds the updating of a photo album. The update reminder message may vary with different types of data, or one update reminder message may be configured for all types of data with a type indicator or type filed contained in the update reminder message.

In the following, take photo album as an example of the data of the certain type for ease of illustration.

The terminal then detects based on the update reminder message whether it has anchor point information corresponding to the update reminder message at the terminal, to be specific, anchor point information corresponding to the type of data (that is, photo album) indicated by the type indicator or type field in the update reminder message or indicated by the update reminder message per se for example, where the anchor point information may be used to indicate a version number as well as information associated with the version number at the time of backup. When the anchor point information corresponding to the update reminder message is detected at the terminal, the anchor point information is sent to the cloud server which then may generate an update data packet based on the anchor point information received. Thereafter, the terminal may perform an incremental update based on the update data packet. In case an update reminder message for updating a photo album is received from the cloud server, the terminal may perform an incremental update on the photo album based on the update data packet.

In addition, as illustrated in FIG. 1, the system for updating data may also include a cloud server storing cloud service data and anchor point information associated with the cloud service data, such as cloud photo album, text messages, call records, contacts, document, audio/video, calendar, email, system settings, and anchor point information associated therewith. The cloud server is typically configured to push an update reminder message to the terminal, generate an update data packet based on anchor point information stored locally at the terminal and sent to the cloud server, and send the update data packet to the terminal so that the terminal can perform incremental update based on the update data packet.

It will be appreciated that in the system for updating data illustrated in FIG. 1, although only one cloud server is illustrated, each terminal may, in fact, correspond to multiple cloud servers and can communicate with the cloud servers using respective accounts and passwords.

The system for updating data will now be described in detail from separate perspectives.

Terminal Side

The following implementations will be described with regard to the method for updating data applied to the terminal. The apparatus for updating data that implements the method for updating data can be integrated into a terminal such as a mobile phone, a tablet computer, a personal digital assistant (PDA), etc.

According to the method for updating data, at the terminal side, the terminal may receive an update reminder message from the cloud server, and then may detect based on the received update reminder message whether it has anchor point information corresponding to the update reminder message. If the anchor point information corresponding to the update reminder message is detected, the terminal would send the anchor point information to the cloud server and then receive an update data packet generated by the cloud server based on the anchor point information, thereby updating data locally stored at the terminal. The method for updating data will now be described in more detail with additional reference to FIG. 2.

Figure 2:
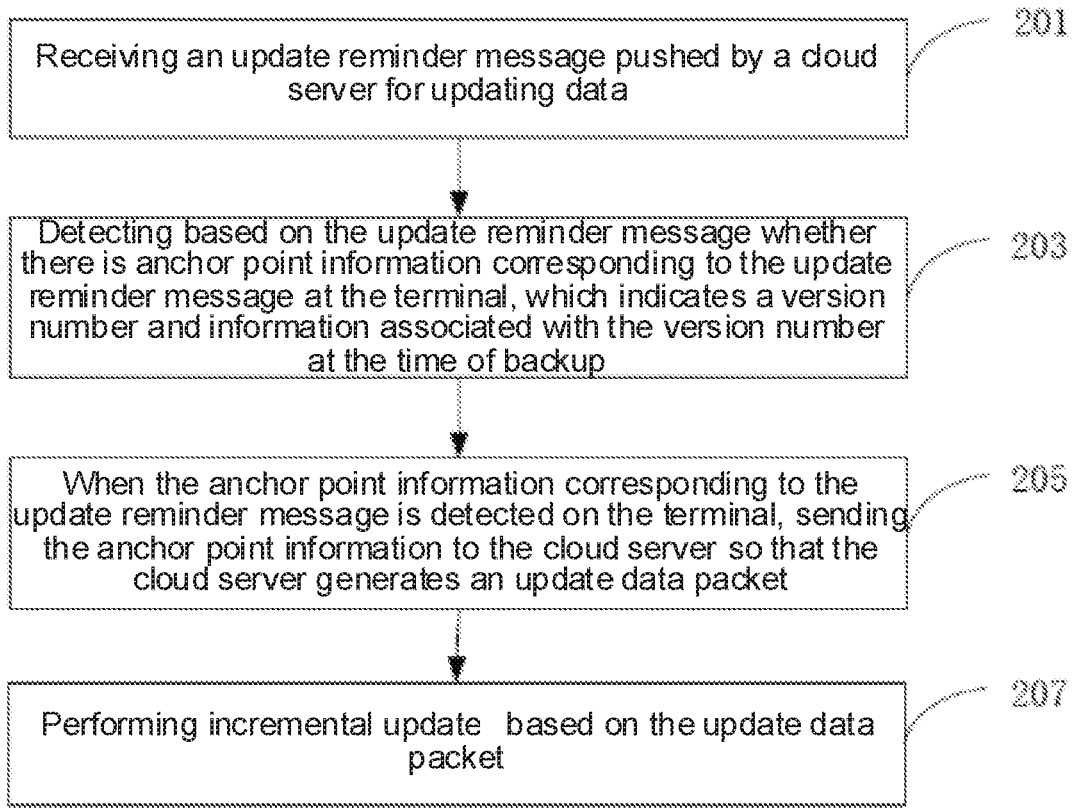
FIG. 2 is an illustrative flowchart of a method for updating data in accordance with an implementation of the disclosure.

FIG. 2 is a flowchart illustrating the method for updating data in accordance with an implementation of the disclosure. The method may begin at block 201.

At block 201, an update reminder message is received from a cloud server.

It will be appreciated that to facilitate user login, a cloud account can be associated with multiple terminals; that is, multiple terminals can use the same cloud account to log in to the cloud server. For example, when the user logs in to a cloud server for the first time using a cloud account, or when the user logs in to the cloud server with a different terminal, or when the cloud account is switched to another to log in to the cloud server, then the cloud server may determine whether there emerges new data at the cloud server, and push the update reminder message to the terminal, if there is new data.

At block 203, anchor point information corresponding to the update reminder message is detected at the terminal. For example, the terminal may detect whether it has stored anchor point information corresponding to the update reminder message, in particular, anchor point information corresponding to the type of data (more specifically, data to be updated) as indicated by a type indicator or type filed in the update reminder message or as indicated by the update reminder message per se. The anchor point information may be used to indicate a version number—the larger the version number, the more recent or later the updating time. As an implementation, the anchor point information, in addition to indicating the version number, is further configured to indicate information associated with the version number at the time of back-ups, such as account identification (ID) information, device identification information, and the like.

In this implementation, when receiving the update reminder message from the cloud server, the terminal may detect whether there is anchor point information corresponding to the update reminder message at the terminal and determine, based on the detection of the anchor point information, whether to perform incremental update or full update on data (such as the photo album) of the terminal.

For example, if the update reminder message is used to prompt the updating of a photo album, then the terminal, upon reception of the update reminder message, may first detect whether there is anchor point information corresponding to the photo album, and then decide to perform incremental update or full update on data of the terminal based on the anchor point information. If there is anchor point information corresponding to the photo album, the terminal can obtain anchor point details according to the anchor point in the anchor point information and further determine photo data to be updated based on the anchor point details, and then update the photo data, in other words, incremental update is performed at the terminal.

At block 205, when the anchor point information corresponding to the update reminder message is detected at the terminal, the anchor point information is sent to the cloud server, so that the cloud server may generate an update data packet based on the anchor point information received from the terminal.

In some implementations, for example, when the anchor point information is detected at the terminal, the terminal may send the anchor point information to the cloud server, and the cloud server may generate an update data packet based on the anchor point information received from the terminal in conjunction with anchor point information locally stored at the cloud server, and further send the generated update data packet to the terminal.

In some implementations, the cloud server does not always generate the update data packet unconditionally, but may determine the validity of the anchor information received from the terminal and decide whether to generate the update data packet based on the validity.

In one implementation, after the terminal sends the anchor point information to the cloud server, the cloud server may first determine whether the anchor point information sent by the terminal is valid. In one implementation, if the anchor point information sent by the terminal is determined as valid, then the operation of generating the update data packet based on the anchor point information will be triggered, and in this case, the terminal will subsequently receive the update data packet from the cloud server.

On the other hand, in another implementation, after sending the anchor point information to the cloud server, the terminal may alternatively receive an anchor point abnormal message returned by the cloud server because of invalid anchor point information. That is, if determining the anchor point information sent by the terminal as invalid, the cloud server may generate and send the anchor point abnormal message to the terminal. In response to the anchor point abnormal message, the terminal may perform a full update at the terminal.

It will be understood that the cloud server can determine whether the anchor point information sent by the terminal is valid based on at least one selected from a group consisting of account identification information and terminal identification information indicated in the anchor point information, or based on other information, which won't be limited herein.

In some implementations, the user can choose whether or not data updating is required. For example, when the updating time of the anchor point information at the terminal is later than that of the latest anchor point information at the cloud server, it can be considered that the user has modified the data at the terminal, and a prompt mechanism may be triggered. If the user chooses to update, then updating would be performed. Otherwise, if the user chooses not to update, then the data updating process would be exited directly, which is more humane and can reduce the load at the terminal, thereby improving operating efficiency of the processor and saving power.

On basis of the above, when the terminal detects the anchor point information corresponding to the update reminder message thereon, the method for updating data may further include the following operations.

(1) Acquiring the latest anchor point information at the cloud server.

The latest anchor point information is the anchor point information with the latest updating time.

(2) Generating and displaying a prompt message, if the anchor point information corresponding to the update reminder message at the terminal is later than the latest anchor point information at the cloud server.

The prompt message is used to remind whether to perform data updating. Data updating may include downloading data from the cloud server, uploading data to the cloud server, and the like.

(3) Receiving a selection with regard to whether to perform updating input by the user based on the prompt message.

At block 207, incremental update (which can be referred to as a first update process for the sake of differentiation) is performed on data at the terminal, based on the update data packet.

For example, after the terminal receives the update data packet, an updating operation such as addition, modification, or deletion may be performed on a photo album corresponding to the anchor point information at the terminal based on the update data packet, that is, incremental update is performed.

The above describes the operation of the terminal in the case where at block 203 the anchor point information corresponding to the update reminder message is detected. In some implementations, on the other hand, if at block 203 the terminal detects no anchor point information corresponding to the update reminder message at the terminal, then full update (which can be referred to as a second update process) may be performed at the terminal.

For example, when the terminal logs in to the cloud server for the first time, there would be no anchor point information at the terminal. So, the terminal may request a full update and then download required cloud data (e.g., cloud photo album data) from the cloud server, thereby performing the full update at the terminal based on the cloud data.

In some implementations, after full update at the terminal have been performed based on the cloud data, the latest anchor point information returned by the cloud server can be received and saved locally at the terminal as the anchor point information of the terminal, so that next time an update reminder message is received, the anchor point information saved can be transmitted to the cloud server, where the latest anchor point information is the anchor point information with the latest updating time.

Terms "first", "second", "third" and the like as used herein are meant to distinguish between different subjects, instead of describing a particular order. In addition, the terms "including", "comprising", "having" and any variations thereof are intended to encompass non-exclusive inclusions.

As can be seen from the above method for updating data provided by the implementations, when receiving the update reminder message, the terminal may detect the anchor point information corresponding to the update reminder message at the terminal. If the terminal has the anchor point information corresponding to the update reminder message, that is, if the anchor point information corresponding to the update reminder message is detected at the terminal, the terminal would send the above anchor point information to the cloud server. The cloud server then may generate the update data packet based on the anchor point information by using a merge algorithm for example, so that the terminal can perform an incremental update on its data (such as a photo album) based on the update data packet. In other words, the anchor point information is used to determine the consistency or synchronization between the data at the terminal and that at the cloud server, and the terminal can perform incremental update using the update data packet that is generated by the cloud server based on the anchor point information, thus saving the user from performing repetitive operations and improving the efficiency of data synchronization operation.

Cloud Server Side

The following implementations will be described from the perspective of the method for updating data applied to the cloud server. The associated apparatus for updating data that implements the method for updating data can be integrated into a network device such as a cloud server. According to this method for updating data, at the cloud server side, the server pushes an update reminder message to the terminal, acquires anchor point information that the terminal detects based on the update reminder message, then generates an update data packet based on the anchor point information and further sends the update data packet to the terminal for data updating at the terminal. The method for updating data will now be described in more detail with additional reference to FIG. 3.

Figure 3:
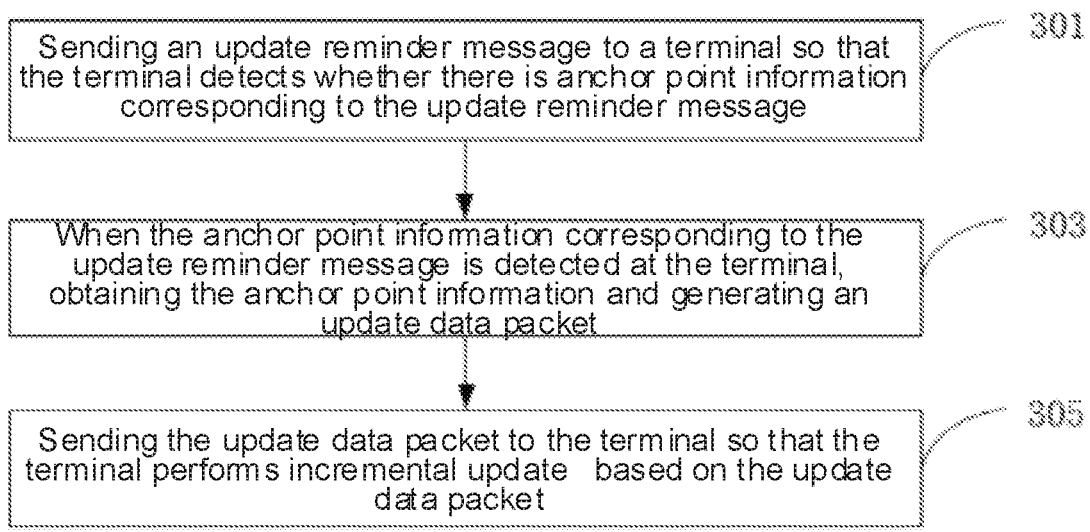
FIG. 3 is another illustrative flowchart of a method for updating data in accordance with an implementation of the disclosure.

FIG. 3 is a flowchart of a method for updating data in accordance with an implementation of the disclosure. The method may begin at block 301.

At block 301, an update reminder message is sent to the terminal so that the terminal detects based on the update reminder message whether there is anchor point information corresponding to the update reminder message at the terminal.

It will be appreciated that when the user logs in to a cloud server for the first time using a cloud account, or when the user logs in to the cloud server with a different terminal, or when the cloud account is switched to another to log in to the cloud server, then the cloud server may determine whether new data emerges at the cloud server, and push the update reminder message to the terminal, if there is new data. For example, the cloud server may push the update reminder message to the terminal to inform an update for a photo album and in this case, the type of data indicated by the update reminder message is photo album, and accordingly, upon reception of the update reminder message at the terminal side, the terminal may first detect whether there is anchor point information corresponding to photo album, and then decide to perform incremental update or full update on data (such as a photo album) of the terminal depending on the anchor point information.

As previously described, the anchor point information mentioned in the implementations of the disclosure can be understood as an anchor point model. The anchor point model may include account identification information, terminal identification information, an anchor point, and anchor point details. The anchor point can be regarded as a version number generated during backup by the user. The anchor point details refer to data information involved in submitting a version, such as source data identification information, time information, backup operation records information, etc. For example, if the anchor point information is anchor point information associated with a photo album, the terminal can obtain the associated anchor point details according to the anchor point in the anchor point information and further determine photo data to be updated based on the anchor point details.

At block 303, the anchor point information of the terminal is received and an update data packet is generated based on the anchor point information.

For example, when the terminal detects the presence of the anchor point information corresponding to the update reminder message at the terminal, the terminal may send the anchor point information to the cloud server, and the cloud server may generate an update data packet based on the anchor point information received from the terminal in conjunction with anchor point information stored at the cloud server locally, and further send the generated update data packet to the terminal.

In some implementations, the cloud server may generate the update data packet as follows.

(11) Comparing the anchor point information received from the terminal with anchor point information at the cloud server.

(12) Determining target anchor point information based on the comparison, where the target anchor point information is anchor point information that satisfies a certain condition. For example, when the anchor point information indicates version information, the condition may be that the version corresponding to the version information indicated by the target anchor point information is larger or newer than that corresponding to the version information indicated by the anchor point information received from the terminal. That is, the condition requires the target anchor point information at the cloud server being later than the anchor point information received from the terminal.

(13) Generating the update data packet based on the target anchor point information using a merge algorithm or merge scheme.

It will be appreciated that in some implementations the anchor point can be understood as a version number generated at the time of backup by the user; the larger the version number, the more recent the updating time, and the newer the data (e.g., photo data, text data, video data, historical mails, etc.) indicated by the anchor point.

For example, if the anchor point in the anchor point information received from the terminal by the cloud server is "Last: 1000", while the largest anchor point at the cloud server is "Last: 1003", then anchor points at the cloud server that are larger than "Last: 1000" would include "Last: 1001", "Last: 1002", and "Last: 1003", so that the anchor point information containing the anchor points "Last: 1001", "Last: 1002", and "Last: 1003" will be taken as the target anchor point information.

Further, data corresponding to the anchor point information of the anchor points "Last: 1001", "Last: 1002", and "Last: 1003" may be merged using the merge algorithm to generate the update data packet.

At block 305, the update data packet is sent to the terminal so that the terminal can update its data based on the update data packet.

As an implementation, the update mentioned at block 305 may be an incremental update. For example, after the terminal receives the update data packet, the incremental update may be performed on a photo album based on the update data packet, for example, an updating operation such as addition, modification, or deletion may be performed on the photo album.

In some implementations, upon reception of the anchor point information sent by the terminal, the cloud server may first determine whether the anchor point information received from the terminal is valid. For example, the cloud server can determine whether the anchor point information received from the terminal is valid according to account identification information and terminal identification information indicated in the anchor point information—e.g., by determining whether the account identification information and the terminal identification information can be found at the cloud server. If they can be found, then the anchor point information is valid; otherwise, if they can't be found, then the anchor point information would be considered as invalid.

For example, the above operations can be achieved as follows.

(21) Acquiring information contained in the anchor point information, including the account identification information and the terminal identification information. As an implementation, the information contained in the anchor point information may not include the terminal identification information and in this case, the following operations would be performed based on the account identification information only.

(22) Determining whether the account identification information and the terminal identification information can be searched out at the cloud server.

(23) Determining the anchor point information is valid if the account identification information and the terminal identification information can be found, and triggering the operation of generating the update data packet based on the anchor point information.

(24) Determining the anchor point information is invalid if the account identification information and the terminal identification information cannot be found, and returning an anchor point abnormal message to the terminal.

In short, if the anchor point information received from the terminal is determined as valid, then the operation of generating the update data packet based on the anchor point information will be triggered; otherwise if the anchor point information is invalid, the cloud server would return the anchor point abnormal message to the terminal, such that the terminal may perform full update at the terminal.

As can be seen from the above method for updating data according to the implementations, the server pushes the update reminder message to the terminal, acquires the anchor point information that the terminal detects based on the update reminder message, and then generates the update data packet based on the anchor point information and finally sends the update data packet to the terminal for data updating of the terminal, thereby avoiding repetitive operations of the user when conducting data synchronous, and improving the efficiency of data synchronization operation.

Interaction Between a Terminal and a Cloud Server

The methods described in the above implementations will be described in further detail below, which will be described from the perspective of the interaction between the cloud server and the terminal, as illustrated in FIG. 1.

Figure 4A:
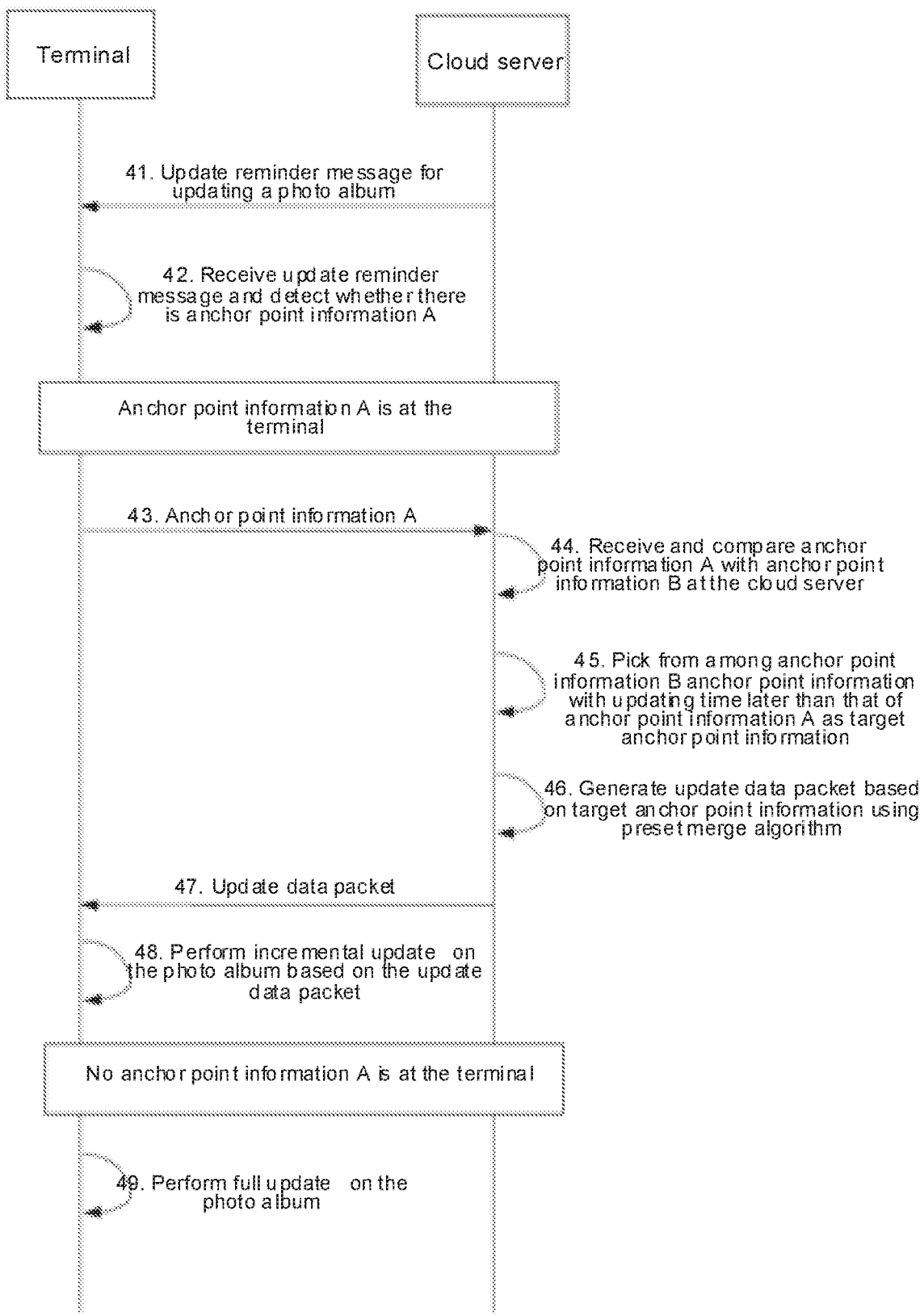
FIG. 4A is an illustrative interaction diagram of a method for updating data in accordance with an implementation of the disclosure.

In this implementation, description is made taking "photo" as an example of "data", but the disclosure will not be limited thereto, "data" may also refer to text, document, video, audio, dynamic picture, email, calendar, and the like. FIG. 4 illustrates a flowchart of a method for updating data in accordance with an implementation of the disclosure. The method may begin with operation 41.

In operation 41, a cloud server pushes an update reminder message associated with a photo album, that is, an update reminder message for updating a photo album, to a terminal.

For example, when the user logs in to the cloud server for the first time using a cloud account, or when the user logs in to the cloud server with a different terminal, or when the cloud account is switched to another to log in to the cloud server, then the cloud server may determine whether there emerges new photo data at the cloud server, and push the update reminder message to the terminal to inform the terminal of an available update for a photo album for example, if there is new data.

In operation 42, the terminal receives the update reminder message and detects whether there is anchor point information A corresponding to the update reminder message at the terminal.

Upon reception of the update reminder message, the terminal may first detect whether there is anchor point information associated with the photo album (in short, photo album anchor point information), and then decide to perform incremental update or full update on data (such as a photo album) of the terminal depending on the anchor point information. For example, if the photo-album anchor point information is detected, then operations 43 through 48 may be performed for incremental update of photos. Otherwise, if no anchor point information of the photo album is detected, then operation 49 would be performed for a full update of photos.

In this implementation, the anchor point information refers to version number as well as information associated with the version number at the time of backup. The anchor point information can be understood as an anchor point model that includes account identification information—also called user identification information (user_id), terminal identification information (device_sn), an anchor point (last), and anchor point details (info). The anchor point can be regarded as a version number generated during backup by the user. The anchor point details refer to data information involved in submitting a version, such as source data identification information, time information, backup operation record information, etc. Reference is made to Table 1, which is a simple illustration of the anchor point model provided by implementations herein.

TABLE 1

| Attribute | Name | Required | Format | Description |
| --- | --- | --- | --- | --- |
| User_id | User ID | Yes | Integer | Account ID |
| Device_sn | Device ID | No | Integer | Terminal ID |
| last | Anchor point | Yes | Integer | Version number generated at the time of backup by the user |
| info | Anchor point details | Yes | Characters | Data information involved in submitting a version |

For example, the account identification information can be 8005400130, while the terminal identification information can be 8124575565475825664. The user may perform one backup operation, which includes the addition of two photos, the modification of a photo, and the deletion of a photo. In this case, the following information would be saved to the anchor point details at the cloud server.

Anchor point details:

[{"gid":"62dc5aff62934993af596693a9428964","op":0}, {"gid":"fcb7a52de68d4c43a b52969e384f5614","op":0}, {"gid":"317128f059c94db3a208e04fb30a59be","op":2}, {"gid":"aa7 e36862a6145f794a5f37e68d1b5d9","op":1}]

Where gid is a unique photo ID generated for each photo at the cloud server, while op stands for a backup operation record (0: addition, 1: deletion, 2: modification).

It will be appreciated that for illustrative purposes, in this implementation, the photo album anchor point information at the terminal can be referred to as anchor point information A, while photo album anchor point information at the cloud server can be referred to as anchor point information B, which however will not constitute a limitation to the disclosure.

In operation 43, the terminal sends anchor point information A to the cloud server.

In operation 44, the cloud server receives the anchor point information A and compares anchor point information A with anchor point information B at the cloud server.

In some implementations, after receiving anchor point information A, the cloud server may determine the validity of anchor point information A, and then trigger the operation of comparing anchor point information A with anchor point information B at the cloud server (i.e., operation 44) if anchor point information A is determined as valid. Otherwise, if anchor point information A is determined as invalid, then an anchor point abnormal message may be generated and sent to the terminal from the cloud server. The terminal may receive the anchor point abnormal message returned from the cloud server and accordingly perform a full update on the photo album of the terminal.

In operation 45, the cloud server acquires from among anchor point information B anchor point information that is larger than anchor point information A, based on the comparison result, and takes anchor point information larger than anchor point information A as target anchor point information.

For example, the anchor point in anchor point information A may be expressed as "Last: 1000", while the largest anchor point at the cloud server is "Last: 1003", then anchor points at the cloud server that are larger than "Last: 1000" would include "Last: 1001", "Last: 1002", and "Last: 1003". Thus, the anchor point information corresponding to the anchor points "Last: 1001", "Last: 1002", and "Last: 1003" will be taken as the target anchor point information.

In operation 46, the cloud server generates an update data packet based on the target anchor point information using a preset merge algorithm.

For example, photo data corresponding to the anchor point information of the anchor points "Last: 1001", "Last: 1002" and "Last: 1003" may be merged using the preset merge algorithm to generate the update data packet.

In operation 47, the cloud server sends the update data packet to the terminal.

In operation 48, the terminal performs an incremental update on its photo album based on the update data packet, that is, updates the changed photo in the photo album.

For example, after receiving the update data packet from the cloud server, the terminal may perform an incremental update on the photo album at the terminal based on the update data packet, for example, an updating operation such as addition, modification, or deletion may be performed on the photo album.

In operation 49, the terminal performs a full update on its photo album, such as downing the data of the photo album from the cloud server and replacing the photo album at the terminal with the download photo album.

For example, when the terminal is a new terminal logs into the cloud server for the first time, there would be no anchor point information A at the terminal. So, the terminal system will request a full update and then can download required cloud data (e.g., cloud photo album data) from the cloud server, thereby performing a full update on photo album data of the terminal based on the download cloud photo album data.

Merge Operation

Figure 5:
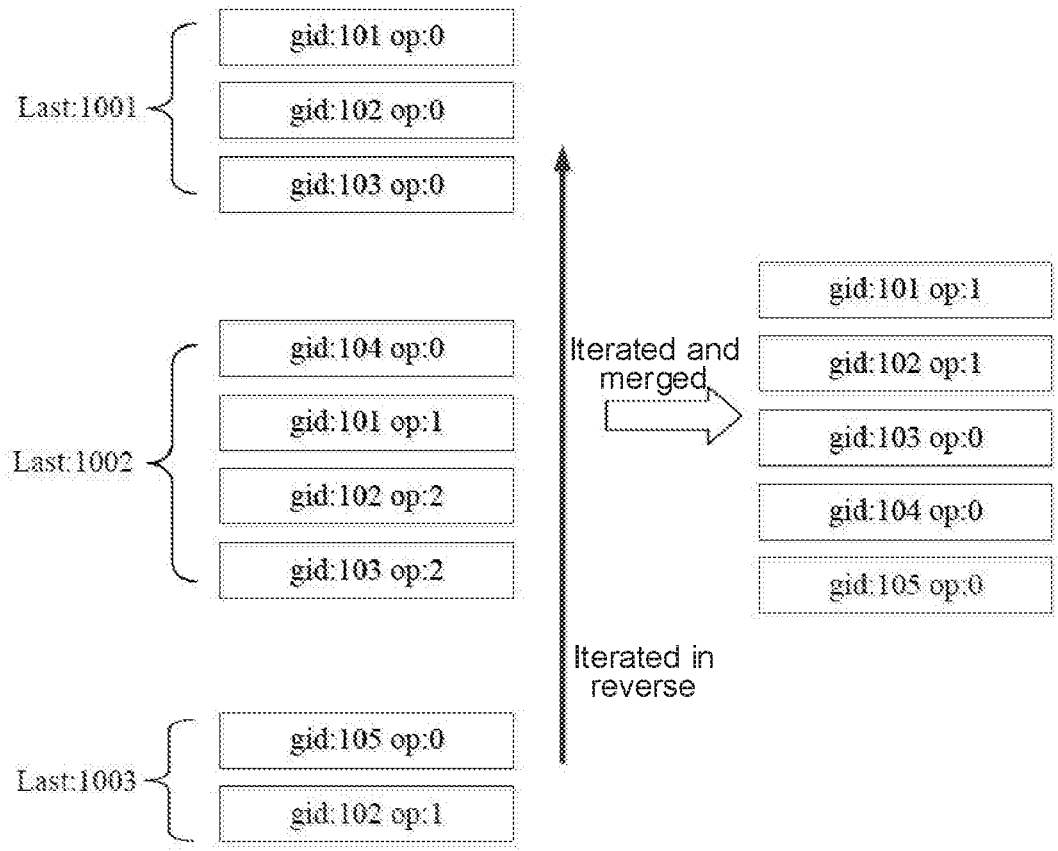
FIG. 5 is a schematic diagram illustrating the generation of an update data packet in accordance with an implementation of the disclosure.

FIG. 5 is a schematic diagram illustrating the generation of the update data packet by the cloud server based on the target anchor point information. For example, the target anchor point information may contain the anchor point information of the anchor points "Last: 1001", "Last: 1002", and "Last: 1003", where as described above, op (0: addition, 1: deletion, 2: modification). The respective anchor point details of these anchor points can be briefly given as follows:

1. The anchor point details in "Last: 1001" may include:

"gid:101 op:0", "gid:102 op:0", and "gid:103 op:0".

2. The anchor point details in "Last: 1002" may include:

"gid:104 op:0", "gid:101 op:1", "gid:102 op:2", and "gid:103 op:2".

3. The anchor point details in "Last: 1003" may include:

"gid:105 op:0" and "gid:102 op:1".

Further, photo data corresponding to the anchor point information of the anchor points "Last: 1001", "Last: 1002", and "Last: 1003" can be merged. In order to achieve the merger operation, as one implementation, two containers may first be created and initialized, with one being an addition/modification container, the other being a deletion container. After the target anchor point information is acquired, as illustrated in FIG. 5, the various target anchor points may be iterated in reverse based on actual anchor points (i.e., version numbers), where the iterative process is based on the following two principles.

(1) If the current anchor point details record an addition or modification operation, search the deletion container for a record of this photo (i.e., the photo gid); if the photo record is in this container, determine the current record as invalid, otherwise turn to principle (2).

If the current anchor point details record a deletion operation, then this record will be inserted directly to the deletion container. That is, the deletion operation takes precedence over the of the modification/addition operation.

(2) Determine whether the gid of the current record is present in the addition/modification container. If it does not exist, then insert it directly to the addition/modification container; otherwise, skip handling.

Then the records in the addition/modification container and those in the deletion container may be merged, where op in the addition/modification container is set to op:0, while that in the deletion container is set to op:1, thus resulting in the following merging results:

"gid:101 op:1", "gid:102 op:1", "gid:103 op:0", "gid:104 op:0", and "gid:105 op:0".

Thereafter, the cloud server can determine the photo data based on the respective anchor point details, and thereby derive the update data packet based on these photo data.

An exemplary algorithm for the merge operation is given below.

```
private void processDeltaData(RecoveryReq req, RecoveryResp
resp, List<ItemCommitInfo> itemCommitInfos, Set<String>
modifySet, Set<String> deleteSet) {
    Map<String, String> modifyMap = new HashMap<>( );
    Map<String, String> deleteMap = new HashMap<>( );
    for (ItemCommitInfo itemCommitInfo : itemCommitInfos) {
        String infoJson = itemCommitInfo.getInfo( );
        if(StringUtils.isBlank(infoJson)||"null".equals(infoJson)){
            continue;
        }
        logger.debug(" itemCommitInfo info json:{ }", infoJson);
        List<Info> commitInfos = JsonUtil.jsonToObject(infoJson,
new TypeReference<List<Info>>( ) { });
        if(commitInfos==null){
            continue;
        }
        for (Info info : commitInfos) {
                        // only the last operation of the globalId
will be processed
            if (modifyMap.containsKey(info.getGid( )) ||
deleteMap.containsKey(info.getGid( ))) {
                continue;
            }
            if (info.getOp( ) ==
            ItemCommitInfo.Info.OP_NEW ||
        info.getOp( ) == ItemCommitInfo.Info.OP_UPD) {
                modifyMap.put(info.getGid( ),
                itemCommitInfo.getDeviceSN( ));
        } else {
                deleteMap.put(info.getGid( ),
                itemCommitInfo.getDeviceSN( ));
        }
    }
}
}
```

Figure 4B:
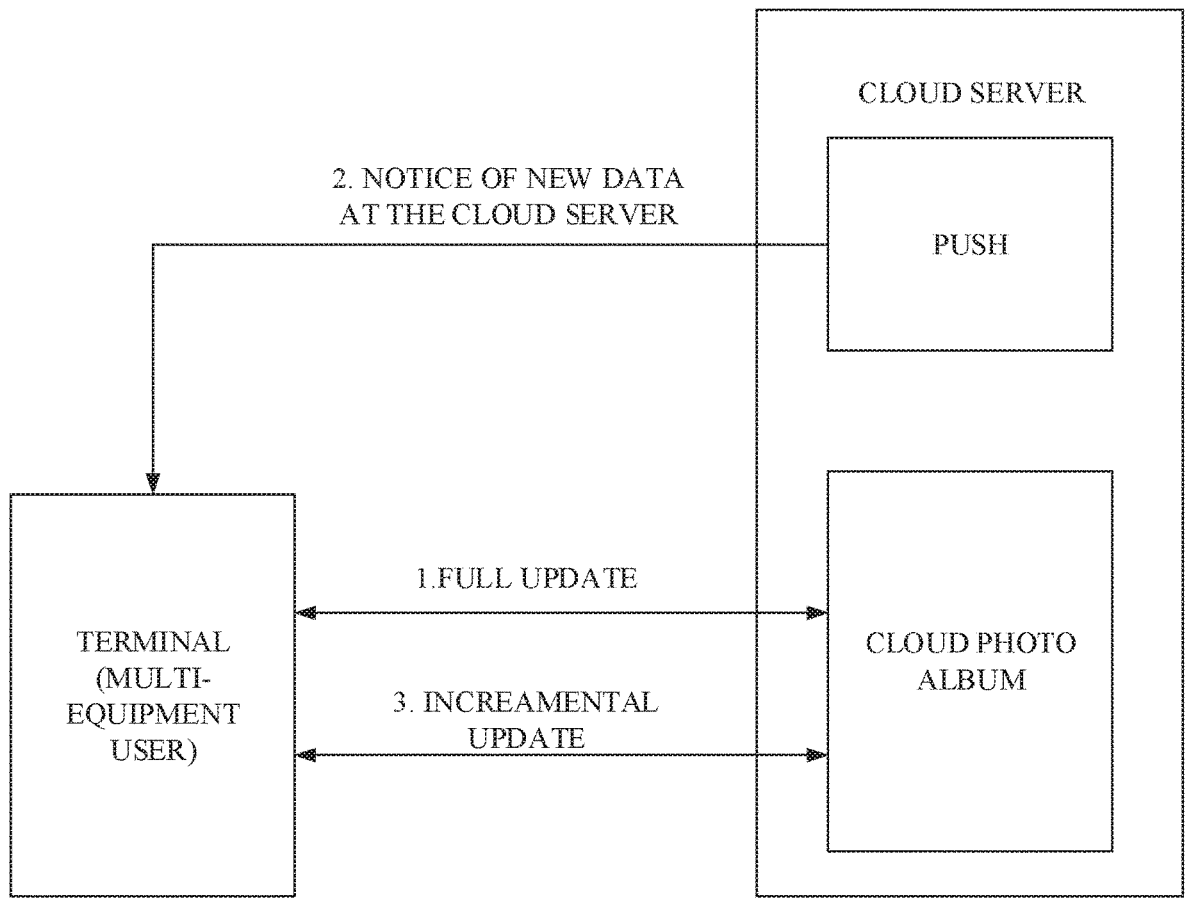
FIG. 4B is another illustrative interaction diagram of a method for updating data in accordance with an implementation of the disclosure.

In order to better understand full update and incremental update of the present disclosure, FIG. 4B illustrates an example of interaction between the cloud server and the terminal. As illustrated in FIG. 4B, when the terminal logs into a cloud account (for example, the first login, switch account login), it detects there is no anchor point information locally, and perform (1) full update on local data. The terminal can also request the latest anchor point information from the cloud server and store the latest anchor point information returned from the server as anchor point information of the terminal. When the server has new data, it will push (2) a notice about the appearance of the new data to the terminal, and in response to the notice, the terminal will detect whether there is anchor point information corresponding to the notice, if yes, the terminal can perform (3) incremental update on local data such as a photo album, otherwise, the terminal can perform full update.

For details not illustrated in this implementation, please refer to the above-detailed description of the methods for updating data applied to the terminal and to the cloud server.

As can be seen from the above method for updating data according to the implementation, upon reception of the update reminder message, the terminal may detect anchor point information corresponding to the update reminder message at the terminal. If the anchor point information corresponding to the update reminder message is detected, the terminal would send the anchor point information to the cloud server. The cloud server then generates the update data packet based on the anchor point information using the preset merge algorithm, so that the terminal can perform the incremental update (such as addition, deletion, and modification, rather than replacement) on its data that has been changed based on the update data packet. In other words, the anchor point information is used to determine the consistency between the data at the terminal and that at the cloud server, and the terminal can perform incremental update on its data that has been changed using the update data packet generated by cloud server based on the anchor point information, thereby avoiding performing repetitive operations by the user and improving the efficiency of data synchronization operation. That is, according to this disclosure the consistency between the data at the terminal and that at the cloud server is determined by using the anchor point information, instead of by using a differentiation method of data. Further, full update or incremental update can be performed depending on whether there is anchor point information, as such, full update and incremental update can be performed according to actual needs, greatly improving the effectiveness and efficiency of data synchronization operation.

Apparatus

In order to facilitate the implementation of the method for updating data provided by the implementations of the disclosure, apparatuses and computer devices based on the above method for updating data are also provided. Terms, as used in the following description, will have the same meanings as those mentioned in the above method for updating data. For implementation details, please refer to the description of the foregoing method implementations.

Figure 6:
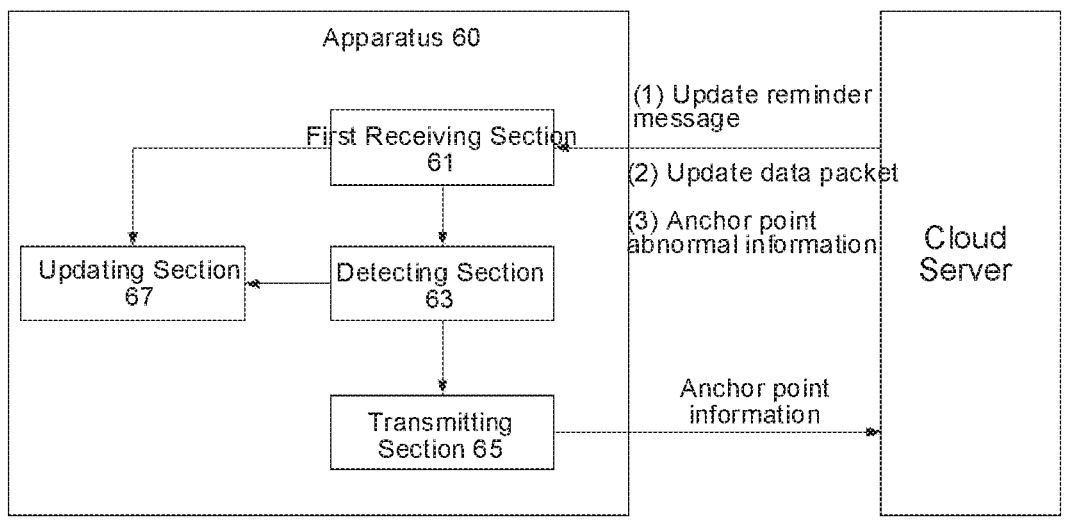
FIG. 6 is an illustrative block diagram of an apparatus for updating data in accordance with an implementation of the disclosure.

FIG. 6 is a block diagram illustrating an apparatus for updating data in accordance with an implementation of the disclosure. The apparatus 60 for updating data as illustrated can be applied to a terminal and can include a first receiving section 61, a detecting section 63, a transmitting section 65, and an updating section 67.

The first receiving section 61 may be a receiver, while the transmitting section 65 may be a transmitter. The first receiving section 61 and the transmitting section 65 may be integrated in a transceiver or an antenna device having transmitting functionality. The detecting section 63 may be a reader, a detector, a comparator, or the like. The updating section 67 may be the processor per se or may be integrated in the processor. In addition, various sections or parts as described above and below may also be embodied as application program interfaces or application program modules allowing for interaction between a cloud server and a terminal. The following description is made to the various sections respectively.

The first receiving section 61 is configured to receive an update reminder message pushed by a cloud server.

It will be appreciated that to facilitate user login, a cloud account can be associated with multiple terminals; that is, multiple terminals and one same cloud account can be used to log in to the cloud server. On the other hand, one terminal can also communicate with multiple cloud servers although only one is illustrated in the figures.

For example, when the user logs in to a cloud server for the first time using a cloud account, or when the login terminal is replaced with another one or when the cloud account is switched to another to log in to the cloud server, the cloud server may determine whether there emerges new data thereon, and push the update reminder message to the terminal, if there is new data.

The detecting section 63 is configured to detect based on the update reminder message whether there is anchor point information corresponding to the update reminder message at the terminal, where the anchor point information may indicate a version number as well as information associated with the version number at the time of backup.

In this implementation, after receiving the update reminder message pushed by the cloud server, the terminal may detect whether there is anchor point information corresponding to the update reminder message, and then determine whether to perform incremental update or full update on data (such as a photo album) of the terminal based on the anchor point information detected. For example, if the anchor point information corresponding to the update reminder message is detected at the terminal, then incremental update can be performed subsequently; otherwise, full update would be performed. For example, if the update reminder message is used to prompt the updating of a photo album, the terminal, upon reception of the update reminder message, may first detect whether there is the anchor point information corresponding to the photo album, and then decide to perform incremental update on the photo album of the terminal according to the anchor point information, if there is the anchor point information corresponding to the photo album.

"Anchor point" typically refers to a type of hyperlink in web page production, also called "named anchor", and is equivalent to a hyperlink within the page. Named anchors can be used to set up tags in a document, where the tags are usually placed at titles or on tops in the document. Then links to these named anchors can be created, which can quickly bring an accessing user to specified locations.

As one implementation, the anchor point information includes the information indicating the version number as well as the information associated with the version number at the time of backup. The anchor point information can be understood as an anchor point model that includes account identification information, terminal identification information, an anchor point, and anchor point details. The anchor point is the version number generated at the time of backup by the user—a link to this anchor point can be created and data associated with the version number can be obtained through this link. The anchor point details refer to data information involved in submitting a version, such as source data identification information, time information, backup operation record information, etc.

For example, the terminal can obtain the associated anchor point details according to the anchor point in the anchor point information corresponding to the update reminder message and further determine the photo data based on the anchor point details.

The transmitting section 65 is configured to send the anchor point information corresponding to the update reminder message to the cloud server when the anchor point information is detected at the terminal, so that the cloud server may generate an update data packet based on the anchor point information received. For example, the cloud server may generate an update data packet based on the anchor point information sent by the terminal in conjunction with anchor point information stored at the cloud server, and further send the generated update data packet to the terminal. The above first receiving section 61 may further be configured to receive the update data packet sent by the cloud server.

The updating section 67 is configured to perform an incremental update based on the update data packet received by the first receiving section 61. For example, after the terminal receives the update data packet for updating photo album, an updating operation such as addition, modification, or deletion may be performed on the photo album of the terminal based on the update data packet.

With respect to the cloud server, after receiving the anchor point information from the terminal, it may determine the validity of the anchor point information, for example, the cloud server may determine whether the anchor point information is valid based on the account identification information and/or terminal identification information contained in or indicated by the anchor point information. For more detail, refer to the foregoing relevant description. When the cloud server determines the anchor point information as invalid, the cloud server may send an anchor point abnormal message to the terminal. With respect to the terminal, the above first receiving section 61 may be further configured to receive the anchor point abnormal message, and the above updating section 67 may perform full update on relevant data (such as the photo album indicated by the update reminder message) of the terminal based on the anchor point abnormal message.

In other words, after the terminal sends the anchor point information to the cloud server, the cloud server may first determine whether the anchor point information sent by the terminal is valid. In one implementation, if the anchor point information sent by the terminal is determined as valid, then generating of the update data packet based on the anchor point information will be triggered. In another implementation, when determining the anchor point information sent by the terminal as invalid, the cloud server may generate and send the anchor point abnormal message to the terminal. The terminal may then receive the anchor point abnormal message returned from the cloud server and accordingly perform a full update on relevant data (such as a photo album) of the terminal.

As another implementation, the above updating section 67 may be further configured to perform a full update on data (such as a photo album) of the terminal when the detecting section 63 detects no anchor point information corresponding to the update reminder message at the terminal.

For example, when the terminal logs in to the cloud server for the first time, there would be no anchor point information at the terminal. So, the terminal system would request a full update and the terminal can then download required cloud data (e.g., cloud photo album data) from the cloud server, thereby performing a full update on data of the terminal based on the cloud data.

Figure 7:
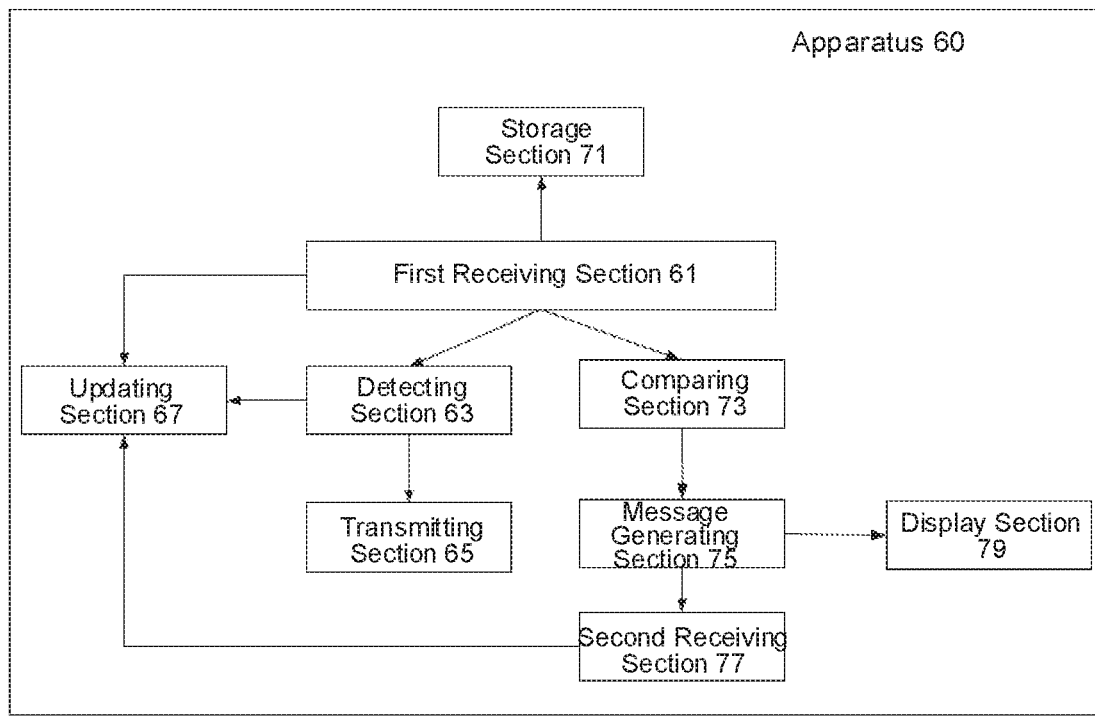
FIG. 7 is another illustrative block diagram of an apparatus for updating data in accordance with an implementation of the disclosure.

In some implementations, as illustrated in FIG. 7, the apparatus 60 for updating data may further include a storage section 71, which can be a memory, a computer-readable medium, a non-volatile storage medium, or the like. After the updating section 67 performs full update on data of the terminal based on the cloud data, the first receiving section 61 may further be configured to receive and save the latest anchor point information returned by the cloud server to the terminal (e.g., to the storage section 71) as the terminal's anchor point information, so that next time an update reminder message is received, the anchor point information can be transmitted to the cloud server, where the latest anchor point information is the anchor point information with the latest updating time.

In addition, as illustrated in FIG. 7, the apparatus 60 for updating data may further include a comparing section 73, a message generating section 75, and a second receiving section 77. The comparing section 73 and the message generating section 75 may be integrated into the processor. The second receiving section 77 may be a user interface, a user interface module or program, a keyboard, a touchscreen, a fingerprint sensor, or the like that can be used for selection operation or input operation of a user.

When the detecting section 63 detects the anchor point information corresponding to the update reminder message at the terminal, the first receiving section 61 may further be configured to acquire the latest anchor point information at the cloud server, where the latest anchor point information is the anchor point information with the latest updating time.

The comparing section 73 may compare the updating time of the terminal's anchor point information with that of the latest anchor point information acquired by the first receiving section 61. The message generating section 75 may be configured to generate and transfer a prompt message to a display section 79 for display, when the updating time of the terminal's anchor point information is later than the latest anchor point information acquired by the first receiving section 61, where the prompt message is used to remind whether to perform subsequent data updating operation. The subsequent data updating operation may be uploading data to the cloud server for synchronization or the like.

The second receiving section 77 is configured to receive an operation instruction the user entered based on the prompt message, and other components such as the updating section 67 can perform corresponding operations in accordance with the operation instruction. For example, if the user chooses to update, then the updating section 67 may proceed to update the terminal's data.

In this implementation, the user can choose whether or not a data updating operation is required before updating the data. For example, when the updating time of the terminal's anchor point information is later than that of the latest anchor point information at the cloud server, it can be considered that the user has already changed the terminal's data, so a prompt mechanism may be triggered. If the user chooses to update, then updating would be performed. Otherwise, if the user chooses not to update, then the data updating process would be directly exited, which is more humane.

The components such as the first receiving section 61 and the transmitting section 65 that communicate with the cloud server can be regarded as an application interface. The components such as the second receiving section 77 that communicates with the user can be regarded as a user interface.

In practice, the various components described above may be implemented as independent entities, or may be arbitrarily combined as one or more entities; for the implementations of the above sections, refer to the description of the foregoing method implementations, so they are not to be detailed again herein.

In at least one implementation, the terminal may further include a cloud management section configured to facilitate the communication with multiple cloud servers as well as an operation on associated cloud data stored on these cloud servers.

In addition, in at least one implementation, when the updating operation entails the transmission either wired or wirelessly, of a file or document, between the terminal and the cloud server, the file or document can be encrypted as appropriate when transmitted over the communication link therebetween. Thus, encrypted transmission of data is enabled and can ensure data transmission safety against eavesdropping.

The apparatus for updating data illustrated in FIG. 6 or FIG. 7 may be integrated in a terminal such as a mobile phone, a tablet computer, a PDA, or the like.

For details not provided in this implementation, refer to the foregoing detailed description of the method for updating data applied to the terminal and the method based on the system for updating data, and will not be detailed again.

As can be seen from the above apparatus for updating data according to this implementation, upon reception of the update reminder message, the terminal may detect whether there is the anchor point information corresponding to the update reminder message at the terminal. If the anchor point information corresponding to the update reminder message is detected at the terminal, the terminal would send the anchor point information to the cloud server. Then the cloud server may generate the update data packet based on the anchor point information, so that the terminal can perform an incremental update on data based on the update data packet. In other words, the anchor point information is used to determine the consistency between the data at the terminal and that at the cloud server, and further the terminal can perform incremental update on its data using the update data packet generated by the cloud server based on the anchor point information, thereby avoiding performing repetitive operations by the user and improving the efficiency of data synchronization operation.

Figure 8:
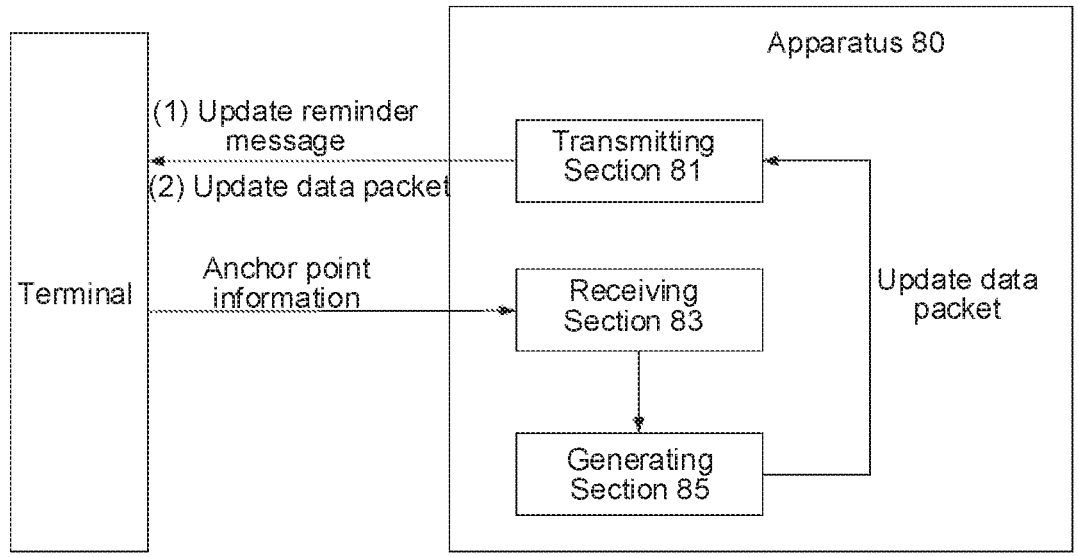
FIG. 8 is an illustrative block diagram of an apparatus for updating data in accordance with an implementation of the disclosure.

FIG. 8 is a block diagram illustrating an apparatus for updating data in accordance with an implementation of the disclosure. The apparatus 80 for updating data as illustrated can be applied to a cloud server and may include a transmitting section 81, a receiving section 83, and a generating section 85. The transmitting section 81 may be a transmitter, while the receiving section 83 may be a receiver. The receiver and the transmitter can be set up individually, or can also be integrated in a single transceiver.

The transmitting section 81 is configured to send an update reminder message to the terminal so that the terminal may detect based on the update reminder message whether there exists anchor point information corresponding to the update reminder message at the terminal.

It will be appreciated that when the user logs in to a cloud server for the first time using a cloud account, or when the login terminal is replaced with another one or when the cloud account is switched to another to log in to the cloud server, the cloud server may determine whether there emerges new data thereon, and then push the update reminder message to the terminal, if there is new data—e.g., the cloud server may push the update reminder message to the terminal to inform of an available update for a photo album.

Furthermore, for example, upon reception of the update reminder message, the terminal may first detect whether there is the anchor point information corresponding to the photo album, and then decide to perform an incremental update or full update on data of the terminal depending on the anchor point information.

For example, in case of anchor point information associated with a photo album, the terminal can obtain anchor point details according to the anchor point in the anchor point information and further determine the photo data based on the anchor point details.

The receiving section 83 is configured to receive the anchor point information from the terminal.

The generating section 85 is configured to generate an update data packet based on the anchor point information received by the receiving section 83. The transmitting section 81 is configured to send the update data packet to the terminal. Thus, the terminal can update its data based on the update data packet in an incremental update manner for example.

For example, after detecting the anchor point information at the terminal, the terminal may send the anchor point information to the cloud server, and the cloud server may then generate the update data packet based on the anchor point information received from the terminal in conjunction with the anchor point information stored at the cloud server itself, and further send the generated update data packet to the terminal.

For example, after the terminal receives the update data packet, the incremental update may be performed on the terminal's photo album based on the update data packet—e.g., an updating operation such as addition, modification, or deletion may be performed on changed data of the photo album.

Figure 9:
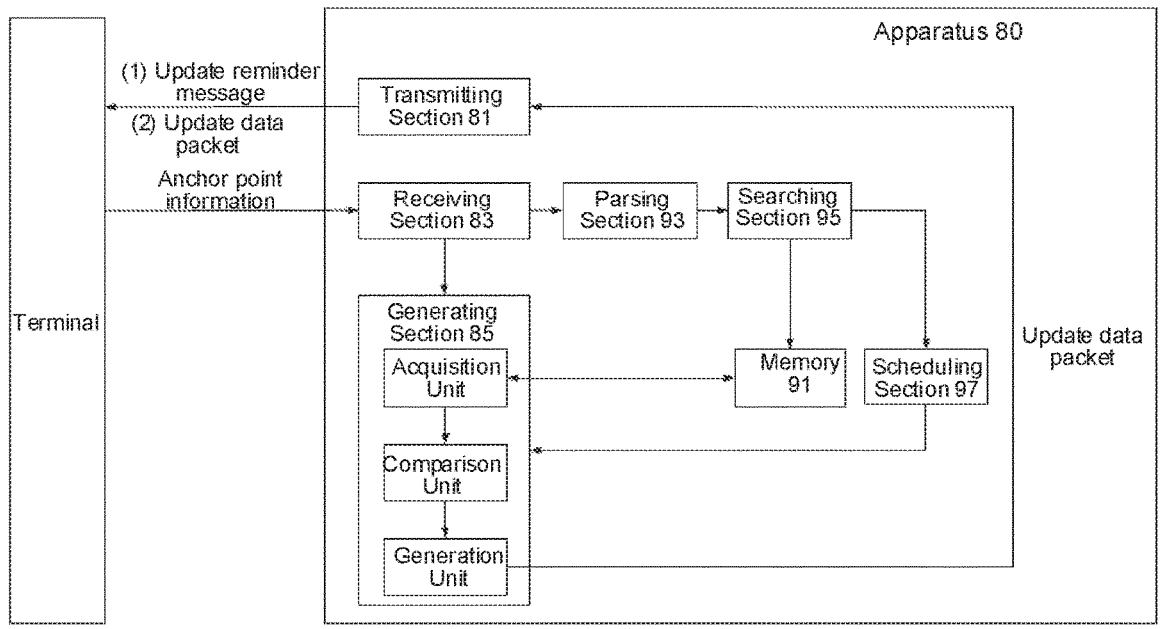
FIG. 9 is another illustrative block diagram of an apparatus for updating data in accordance with an implementation of the disclosure.

FIG. 9 is another block diagram illustrating the apparatus 80 for updating data in accordance with an implementation of the disclosure.

As illustrated in FIG. 9, the generating section 85 of the apparatus 80 for updating data may include an acquisition unit, a comparison unit, and a generation unit.

The acquisition unit is configured to obtain the anchor point information of the cloud server, e.g., from the local memory 91.

The comparison unit is configured to compare the anchor point information received by the receiving section 83 with the anchor point information of the cloud server acquired by the acquisition unit, so as to determine target anchor point information, which is the anchor point information at the cloud server that is larger than the terminal's anchor point information.

The generation unit is configured to generate an update data packet based on the target anchor point information using a preset merge algorithm.

It will be appreciated that in some implementations, the anchor point can be understood as a version number generated at the time of backup by the user; the larger the version number, the later the updating time, and the newer the data indicated by the anchor point.

For example, if the anchor point in the anchor point information acquired locally at the terminal is "Last: 1000", while the largest anchor point at the cloud server is "Last: 1003", then anchor points at the cloud server that are larger than "Last: 1000" would include "Last: 1001", "Last: 1002", and "Last: 1003". Therefore, the anchor point information containing the anchor points "Last: 1001", "Last: 1002", and "Last: 1003" will be taken as the target anchor point information.

Further, photo data corresponding to the anchor point information of the anchor points "Last: 1001", "Last: 1002", and "Last: 1003" may be merged using the preset merge algorithm to generate the update data packet.

As an implementation, after receiving the anchor point information from the terminal, the cloud server may first determine whether the anchor point information sent by the terminal is valid, and then trigger the generating the update data packet based on the anchor point information if the anchor point information as valid; otherwise if the anchor point information sent by the terminal as invalid, the cloud server may return an anchor point abnormal message to the terminal such that the terminal may perform full update on data of the terminal. For example, the cloud server can determine whether the anchor point information received from the terminal is valid on the basis of account identification information and terminal identification information indicated in the anchor point information—e.g., by determining whether the account identification information and the terminal identification information can be found at the cloud server. If they can be found, then the anchor point information would be valid; otherwise, if they can't be found, the anchor point information can be considered as invalid. On basis of this, in some implementations, the apparatus 80 for updating data may further include a parsing section 93, a searching section 95, and a scheduling section 97, as illustrated in FIG. 9.

The parsing section 93 is configured to parse the account identification information and/or terminal identification information indicated in the anchor point information received by the receiving section 83.

The searching section 95 is configured to search at the cloud server for the account identification information and/or terminal identification information that is parsed by the parsing section 93, for example, by searching from a memory.

The scheduling section 97 is configured to designate the generating section 85 to generate the update data packet, when the searching section 95 finds the account identification information and the terminal identification information at the cloud server, i.e., if the terminal's anchor point information is valid. The scheduling section 97 can be integrated into the searching section 95 and operates as part of the later.

The transmitting section 81 may further be configured to return an anchor point abnormal message to the terminal if the searching section 95 fails to find the account identification information and the terminal identification information at the cloud server, i.e., the terminal's anchor information is invalid.

That is, if the anchor point information sent by the terminal as invalid, the cloud server may generate and send the anchor point abnormal message to the terminal. The terminal may then receive the anchor point abnormal message returned from the cloud server and accordingly perform a full update on data of the terminal.

In practice, the various components described above may be implemented as independent entities, or may be arbitrarily combined as one or more entities; for details, refer to the description of the foregoing method implementations, so they are not to be detailed again herein. In addition, the configurations described above are merely exemplary, and the disclosure won't be limited thereto. For example, the above parsing section 93, searching section 95, and scheduling section 97 can also be integrated in the above generating section 85, where in this case the scheduling section 97 can be understood as a component having trigger functionality.

The apparatus for updating data illustrated in FIG. 8 or FIG. 9 may be integrated in a network device such as a cloud server or the like.

For details not provided in this implementation, refer to the above-detailed description of the method for updating data applied to the cloud server and the method based on the system for updating data, and will not be detailed again herein.

As described above, according to the apparatus for updating data provided by this implementation, the cloud server receives the anchor point information from the terminal, and then may generate the update data packet based on the anchor point information using the preset merge algorithm. Thus, the terminal can perform an incremental update on its data (such as a photo album) based on the update data packet. Therefore, the anchor point information is used to determine the consistency between the data at the terminal and that at the cloud server, and the terminal can then perform incremental update on its data using the update data packet generated by the cloud server based on the anchor point information, thereby avoiding performing repetitive operations by the user and improving the efficiency of the data synchronization operation.

Figure 10:
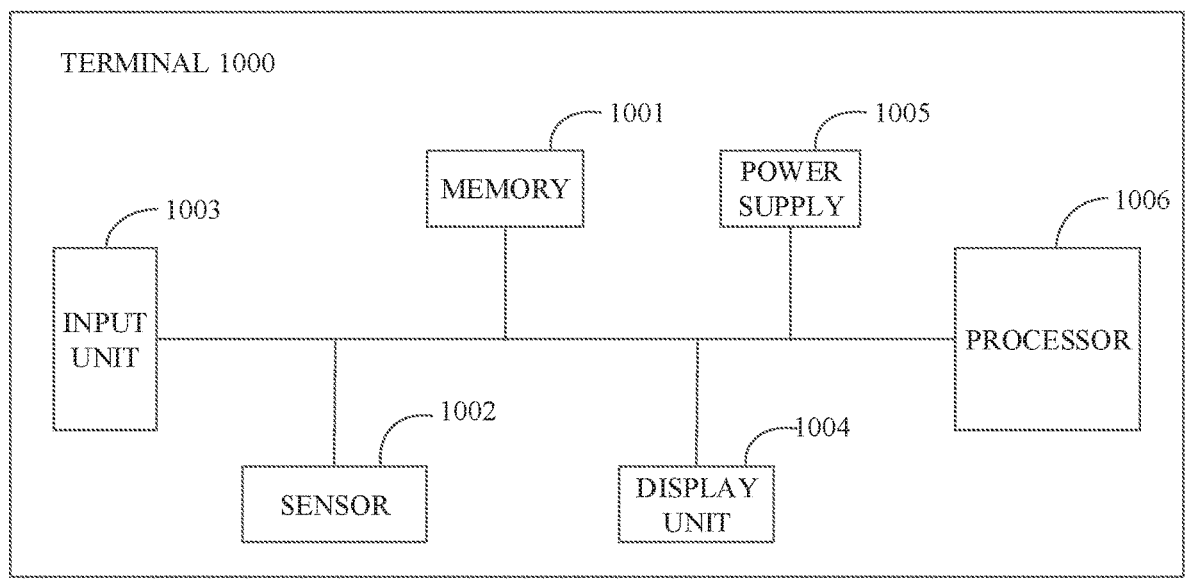
FIG. 10 is an illustrative block diagram of a computer device in accordance with an implementation of the disclosure.

A computer device is further provided. The computer device may be a terminal such as a tablet computer or a PDA, or a mobile terminal such as a mobile phone or a smart phone. FIG. 10 is a block diagram illustrating a terminal in accordance with an implementation of the disclosure. The terminal 1000 may include a memory 1001, a sensor 1002, an input unit 1003, a display unit 1004, a power supply 1005, and a processor 1006 embedded with at least one processing core. Those of skill in the art will be able to appreciate that, the terminal construction as illustrated in FIG. 10 will not constitute limitations to the terminal, more or fewer components than shown may be included, or some components may be additionally combined, or different component arrangements may be employed.

The memory 1001 may be configured to store application programs and data. Application programs stored in the memory 1001 may contain executable program codes (or application programs), and can be used to form various functional modules. The processor 1006 is configured to perform various functional applications and process data by running the application programs stored in the memory 1001. The memory 1001 may include a high-speed random-access memory, and may further include a non-volatile computer-readable memory, such as at least one disk memory, flash memory device, or other non-volatile solid-state memory devices. Accordingly, the memory 1001 may further include a memory controller to provide access to the memory 1001 for the processor 1006 and the input unit 1003.

The terminal may further include at least one sensor 1002, such as a light sensor, a gravity accelerometer, or other sensors. The light sensor may include an ambient light sensor and a proximity sensor. The ambient light sensor may adjust the brightness of the display panel according to the brightness of the ambient light, while the proximity sensor may turn off the display panel and/or backlight when the terminal is moved near the ear. As a type of motion sensor, the gravity accelerometer is capable of detecting the magnitude of acceleration in all directions (usually along three axes). At rest, it can detect the magnitude and direction of gravity and thus can be used for various applications in identifying the position of a phone (e.g., for switching between the landscape and portrait displays, related games, magnetometer attitude calibration), vibration-recognition-related functionalities (e.g., pedometer, percussion), etc. As for a gyroscope, barometer, hygrometer, thermometer, an infrared sensor, and other sensors that can be equipped to the terminal, they are not to be detailed herein.

The input unit 1003 can be configured to receive input digital or character information, or user characteristic information (e.g., fingerprints), and to generate keyboard, mouse, joystick, optical or trackball signal inputs related to user settings and function control. In at least one implementation, the input unit 503 may include a touch-sensitive surface or another input device. The touch-sensitive surface, also known as a touch display screen or a touchpad, can receive a touch operation on or near it by the user (e.g., a user can perform an operation on or near the touch-sensitive surface using a finger, stylus, or any other suitable object or accessory), and drive at least one connected device according to the preset program. In at least one implementation, the touch-sensitive surface may include both a touch detection device and a touch controller. The touch detection device is configured to detect a touch position by the user as well as detect and transmit a signal brought about by the touch operation to the touch controller. The touch controller is configured to receive touch information from the touch detection device, and convert the touch information into touch point coordinates and transfer these touch point coordinates to the processor 1006. The touch controller can also be configured to receive and execute commands from the processor 1006. In addition, touch-sensitive surfaces can be implemented by a variety of types such as resistive, capacitive, infrared, and surface acoustic waves. Apart from the touch-sensitive surface, the input unit 1003 may also include other input devices, which may include, but are not limited to, one or more selected from physical keyboards, function keys (e.g., volume control keys, switch keys, etc.), fingerprint identification modules, trackballs, mice, joysticks, or the like.

The display unit 1004 can be configured to display information input by or provided to the user as well as various graphical user interfaces of the terminal, where the graphical user interface may be constructed out of graphics, text, icons, videos, or any combination of them. The display unit 1004 may include a display panel. In at least one implementation, the display panel may be configured in the form of a liquid crystal display (LCD), an organic light-emitting diode (OLED), or the like. Further, the touch-sensitive surface may cover the display panel. Upon detection of a touch operation on or near it, the touch-sensitive surface may transfer the touch operation to the processor 1006 to determine the type of the touch event. Then the processor 1006 may provide corresponding visual outputs to the touch panel based on the type of the touch event. While the touch-sensitive surface and the display panel are implemented as two separate components to enable the input and output functionalities as illustrated in FIG. 10, in some implementations the touch-sensitive surface and the display panel can be integrally formed.

The terminal may further include a power supply 1005 (e.g., a battery) that supplies power to various components of the terminal. Typically, the power supply 1005 may be logically coupled to the processor 1006 via a power management system or power lines, allowing for functionalities such as charging and discharging management, power consumption management, etc., depending on the power management system. The power supply 1005 may also include at least one component such as a DC or AC power supply, a rechargeable system, a power failure detection circuitry, a power converter or inverter, a power status indicator, and the like.

The processor 1006 operates as a control center of the terminal and communicates with various parts of the entire terminal through various interfaces and lines. The processor 1006 is configured to perform various functionalities of the terminal and process data by running or executing the application programs stored in the memory 1001 and invoking the data stored in the same, thereby enabling overall monitoring of the terminal. The processor 1006 may include one or more processing cores. In addition, the processor 1006 may be integrated with an application processor and a modem processor, where the application processor typically handles the operating system, user interfaces, application programs, and the like.

Although not shown in FIG. 10, the terminal may further include a camera, a Bluetooth module, a network module, etc., which however are not to be detailed herein.

In at least one implementation, the processor 1006 of the terminal may be configured to load at least one application program code into the memory 1001 in accordance with the following instructions, and run the application program code stored in the memory 1001 to implement a variety of functionalities.

Receive an update reminder message pushed by the cloud server; detect whether there is anchor point information corresponding to the update reminder message at the terminal; when the anchor point information corresponding to the update reminder message is detected at the terminal, send the anchor point information detected to the cloud server so that the cloud server can generate an update data packet based on the anchor point information; and perform incremental update on data of the terminal based on the update data packet.

In some implementations, after sending the anchor point information to the cloud server, the processor 1006 may further be configured to receive an anchor point abnormal message returned by the cloud server when the cloud server determines the anchor point information as invalid, and then perform a full update on data of the terminal.

In some implementations, the processor 1006 may be further configured to perform a full update on data of the terminal when no anchor point information corresponding to the update reminder message is detected at the terminal.

In the foregoing, the description of the respective implementations above is given varied focuses, so for the description that hasn't been detailed in an implementation, refer to the foregoing detailed description in relation to the method for updating data, and they are not to be detailed again herein.

The apparatus for updating data provided by this implementation of the disclosure, e.g., a computer, a tablet computer, a mobile phone, etc., equipped with touch functionality, falls in the same conceptual category as the method for updating data illustrated in the foregoing implementations. Any method provided by the above method implementations can be implemented on the apparatus for updating data; for the implementation of the apparatus, see the above method implementations, so they are not to be detailed again herein.

It is noteworthy that those of ordinary skill in the art will able to understand all or part of the operations implementing the method for updating data in accordance with various implementations of the disclosure can be accomplished by controlling the relevant hardware with computer programs. Computer programs can be stored in a non-volatile computer-readable storage medium. For example, they can be stored in a memory of a mobile terminal and executed by at least one processor in the mobile terminal, where the execution process may include the operations of the implementations of the method for updating data. The storage medium may be a magnetic disk, an optical disk, a read-only memory (ROM), a random access memory (RAM), or the like.

Various functional modules of each of the apparatus for updating data in accordance with various implementations of the disclosure can be integrated in one processing chip, or can be physically present as individual modules, or two or more modules can be integrated in one. Mentioned integrated modules can be implemented in the form of hardware, or in the form of software functional modules, or in the form of a combination of hardware or software. If the integrated modules are implemented as software functional units and sold or used as standalone products, they may be stored in a computer-readable storage medium, e.g., a ROM, a magnetic disk, an optical disk, etc.

The method, apparatus, and system for updating data provided by the implementations of the disclosure have been described in detail in the foregoing. Particular examples have been raised to illustrate the principle and implementations of the disclosure. The description of the above implementations, however, is merely intended for rendering a better understanding of the methods and the central idea of the disclosure. Also, those skilled in the art, equipped with the concepts of the disclosure, will be able to contemplate a variety of changes to the various particular implementations and application areas. In view of the foregoing, the description of the specification is not to be construed as limiting the disclosure.

What is claimed is:

1. A method for updating data, comprising:
    receiving, at a terminal from a cloud server, an update reminder message;
    detecting anchor point information corresponding to the update reminder message at the terminal;
    sending the anchor point information to the cloud server when the anchor point information is detected at the terminal, wherein the cloud server generates an update data packet based on the anchor point information;
    performing a first update process on data of the terminal based on the update data packet; and
    performing a second update process on the data of the terminal when no anchor point information corresponding to the update reminder message is detected at the terminal, wherein the second update process comprises a full update.

2. The method of claim 1, wherein the anchor point information is configured to indicate a version number.

3. The method of claim 1, wherein the first update process comprises an incremental update.

4. The method of claim 1, further comprising:
    receiving, after sending the anchor point information to the cloud server, an anchor point abnormal message returned by the cloud server when the anchor point information is invalid; and
    performing the second update process on the data of the terminal in response to the anchor point abnormal message.

5. The method of claim 1, further comprising:
    subsequent to performing the second update process on the data of the terminal, receiving and saving most recent anchor point information returned by the cloud server, wherein the most recent anchor point information is the anchor point information with a latest updating time.

6. The method of claim 1, further comprising:
    when the anchor point information corresponding to the update reminder message is detected at the terminal, obtaining most recent anchor point information at the cloud server, wherein the most recent anchor point information is the anchor point information with a latest updating time;
    generating and displaying a prompt message when an updating time of the anchor point information of the terminal is later than an updating time of the most recent anchor point information at the cloud server, the prompt message being configured to remind whether to perform updating; and
    receiving a selection with regard to whether to perform update inputted by a user based on the prompt message.

7. A method for updating data, comprising:
    transmitting an update reminder message to a terminal, wherein the terminal detects, based on the update reminder message, whether there is anchor point information corresponding to the update reminder message at the terminal, the anchor point information being configured to at least indicate a version number;
    receiving the anchor point information from the terminal, comparing the anchor point information received from the terminal with anchor point information at a cloud server to determine target anchor point information, and generating an update data packet based on the target anchor point information using a merge scheme, wherein the target anchor point information is located at the cloud server, and an updating time of the target anchor point information is more recent than an updating time of the anchor point information received from the terminal; and sending the update data packet to the terminal, wherein the terminal performs an incremental update on data of the terminal based on the update data packet.

8. The method of claim 7, wherein the anchor point information is further configured to indicate account identification information and terminal identification information, and the method further comprises:

subsequent to receiving the anchor point information from the terminal, obtaining the account identification information and the terminal identification information indicated in the anchor point information;

searching at a cloud server for the account identification information and the terminal identification information;

triggering the generating of the update data packet based on the anchor point information when the account identification information and the terminal identification information are found; and returning an anchor point abnormal message to the terminal when the account identification information and the terminal identification information are not found.

9. An apparatus for updating data, comprising a processor and a memory configured to store one or more instructions, the one or more instructions, when executed by the processor, cause a plurality of software sections to perform:

a first receiving section, to receive an update reminder message from a cloud server and to obtain most recent anchor point information at the cloud server, wherein the most recent anchor point information is the anchor point information with a latest updating time;

a detecting section, to detect anchor point information corresponding to the update reminder message at a terminal;

a transmitting section, to send the anchor point information detected by the detecting section to the cloud server, wherein the cloud server generates an update data packet based on the anchor point information;

an updating section, to perform a first update process on data of the terminal based on the update data packet;

a comparison section, to compare an updating time of the most recent anchor point information obtained by the first receiving section with an updating time of the anchor point information of the terminal;

a message generation section, to generate a prompt message when the updating time of the anchor point information of the terminal is later than the updating time of the most recent anchor point information obtained by the first receiving section, the prompt message being configured to remind whether to perform updating; and a second receiving section, to receive an operation instruction that is input based on the prompt message and specifies whether to perform updating.

10. The apparatus of claim 9, wherein the anchor point information is configured to indicate a version number.

11. The apparatus of claim 9, wherein the first update process comprises an incremental update.

12. The apparatus of claim 9, wherein the first receiving section is further configured to receive an anchor point abnormal message returned by the cloud server when the cloud server determines the anchor point information as invalid; and the updating section is further configured to perform a second update process on the data of the terminal, in response to the anchor point abnormal message or when the detecting section detects no anchor point information corresponding to the update reminder message at the terminal.

13. The apparatus of claim 12, wherein the second update process comprises a full update.

14. The apparatus of claim 9, wherein the first receiving section is further configured to receive and save the most recent anchor point information returned by the cloud server to the terminal, wherein the most recent anchor point information is the anchor point information with the latest updating time.

* * * * *